(12) United States Patent
MacFarlane

(10) Patent No.: US 10,196,975 B2
(45) Date of Patent: Feb. 5, 2019

(54) TURBOPROP ENGINE WITH COMPRESSOR TURBINE SHROUD

(71) Applicant: Pratt & Whitney Canada Corp., Longueuil (CA)

(72) Inventor: Ian Alexander MacFarlane, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 261 days.

(21) Appl. No.: 15/203,047

(22) Filed: Jul. 6, 2016

(65) Prior Publication Data
US 2016/0312695 A1 Oct. 27, 2016

Related U.S. Application Data

(63) Continuation of application No. 13/613,904, filed on Sep. 13, 2012, now Pat. No. 9,410,441.

(51) Int. Cl.
| | |
|---|---|
| *F02C 7/20* | (2006.01) |
| *F02C 3/10* | (2006.01) |
| *F01D 11/08* | (2006.01) |
| *F01D 25/24* | (2006.01) |
| *F02C 6/20* | (2006.01) |
| *B64D 27/10* | (2006.01) |

(52) U.S. Cl.
CPC ............... *F02C 3/10* (2013.01); *B64D 27/10* (2013.01); *F01D 11/08* (2013.01); *F01D 25/246* (2013.01); *F02C 6/206* (2013.01); *F02C 7/20* (2013.01); *F05D 2230/642* (2013.01); *F05D 2250/411* (2013.01); *Y10T 29/49236* (2015.01)

(58) Field of Classification Search
CPC .... F02C 3/10; F02C 6/206; F02C 7/20; F01D 25/243; F01D 25/246; F01D 25/28; B64D 27/10; B64D 27/26; B64D 2027/262–2027/268; F23R 3/60; F05D 2240/90; F05D 2230/642; F05D 2250/411; Y10T 29/492236
See application file for complete search history.

(56) References Cited

U.S. PATENT DOCUMENTS

| | | |
|---|---|---|
| 3,830,058 A | 8/1974 | Ainsworth |
| 3,842,595 A | 10/1974 | Smith et al. |
| 4,658,579 A | 4/1987 | Bower et al. |

(Continued)

*Primary Examiner* — William H Rodriguez
*Assistant Examiner* — Jason H Duger
(74) *Attorney, Agent, or Firm* — Norton Rose Fulbright Canada LLP

(57) ABSTRACT

A method of isolating a turbine shroud from propeller loads in an engine having an outer case with a mount defining a mount plane and an attachment location within the mount plane, the mount configured for attachment of the engine to an aircraft at the attachment location to transfer the propeller loads. The shaft of the engine is supported with a portion of the outer case extending from the mount and defining a load path for the propeller loads. The turbine support case is attached to extend free of the load path, by attaching the turbine support case to the outer case only through a connection along the plane, the connection defining a pivot point allowing a limited relative pivoting motion around the pivot point between the turbine support case and the mount. The turbine shroud is located by directly connecting it to the turbine support case.

7 Claims, 4 Drawing Sheets

(56) References Cited

U.S. PATENT DOCUMENTS

| | | |
|---|---|---|
| 4,785,625 A | 11/1988 | Stryker et al. |
| 4,854,525 A | 8/1989 | Chee |
| 5,427,348 A | 6/1995 | Bacon et al. |
| 5,452,575 A | 9/1995 | Freid |
| 5,474,258 A | 12/1995 | Taylor et al. |
| 5,593,277 A | 1/1997 | Proctor et al. |
| 5,746,391 A | 5/1998 | Rodgers et al. |
| 5,806,792 A | 9/1998 | Brossier et al. |
| 5,927,644 A | 7/1999 | Ellis et al. |
| 6,189,830 B1 | 2/2001 | Schnelz et al. |
| 6,619,030 B1 | 9/2003 | Seda et al. |
| 7,156,343 B2 | 1/2007 | Marche |
| 7,207,771 B2 | 4/2007 | Synnott et al. |
| 7,296,768 B2 | 11/2007 | Machado et al. |
| 7,325,770 B2 | 2/2008 | Chevalier et al. |
| 7,497,443 B1 | 3/2009 | Steinetz et al. |
| 7,610,763 B2 | 11/2009 | Somanath et al. |
| 7,681,833 B2 | 3/2010 | Fournier et al. |
| 7,789,619 B2 | 9/2010 | Durand et al. |
| 7,815,145 B2 | 10/2010 | Beardsley |
| 7,866,943 B2 | 1/2011 | Durand et al. |
| 7,909,285 B2 | 3/2011 | Dron et al. |
| 7,909,573 B2 | 3/2011 | Cameriano et al. |
| 8,113,768 B2 | 2/2012 | Somanath et al. |
| 8,118,251 B2 | 2/2012 | Suciu et al. |
| 2004/0251380 A1 | 12/2004 | Pasquer et al. |
| 2008/0267768 A1 | 10/2008 | Dakowski et al. |
| 2009/0308078 A1 | 12/2009 | Foster |
| 2010/0290903 A1* | 11/2010 | Heyerman ............. B64D 27/26 415/213.1 |
| 2011/0127368 A1 | 6/2011 | Penda et al. |
| 2014/0044538 A1 | 2/2014 | Feldmann et al. |

* cited by examiner

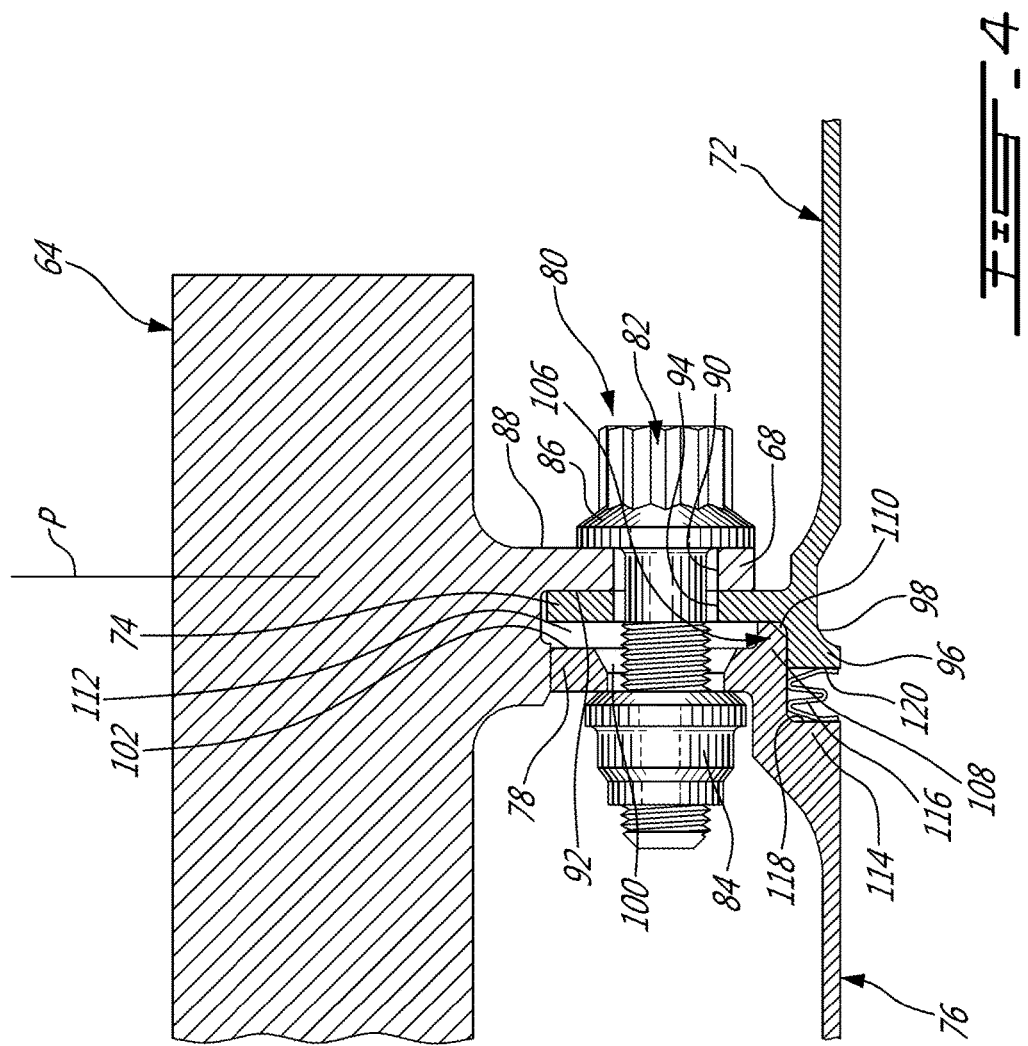

TURBOPROP ENGINE WITH COMPRESSOR TURBINE SHROUD

CROSS-REFERENCE TO RELATED APPLICATIONS

This application is a continuation of U.S. application Ser. No. 13/613,904 filed Sep. 13, 2012, the entire contents of which are incorporated by reference herein

TECHNICAL FIELD

The application relates generally to gas turbine engines and, more particularly, to turboprop engines having a compressor turbine shroud.

BACKGROUND OF THE ART

Engine mounts provide for the transfer of engine thrust to the aircraft, but the first engine mount, or in a case of a single plane mount engine, the single plane mount, also generally transfers loads onto the gas turbine engine during operation. The engine includes various support components which are directly or indirectly connected to the first mount or single plane mount and to the engine core, defining various load paths for transmission of propeller loads from the mount. The propeller loads can thus potentially cause deflections of such support components.

The high pressure turbine rotor located at the exit of the combustor is usually surrounded by a shroud on which cooling air is circulated, for example through impingement cooling. A tight tip clearance must generally be maintained between the shroud and the tip of the rotor blades. The shroud is generally attached to and located by the adjacent vane ring to limit deflections and movement of the shroud during operation. However, air leakage may occur, for example between the shroud and the adjacent turbine support case supporting other stators of the turbine section. The possible tip clearance may also be limited. The structure necessary for attachment of the shroud to the adjacent vane may also impede impingement cooling of the shroud.

SUMMARY

In one aspect, there is provided a turboprop engine comprising: an annular outer case including a mount ring for attachment to an aircraft along a plane to transfer loads from a propeller, the mount ring having an annular flange extending radially inwardly therefrom within the plane; an annular turbine support case received within the outer case and connected to the outer case only through a direct connection with the annular flange allowing a limited relative pivoting motion between the turbine support case and the mount ring; and a turbine section including a rotor closely surrounded by a shroud with an annular tip clearance being defined therebetween, the shroud being directly connected to and located by the turbine support case.

In another aspect, there is provided a turboprop engine comprising: an annular outer case including a mount ring for attachment to an aircraft along a plane, the mount ring having an annular flange extending radially inwardly therefrom within the plane, the annular outer case including a portion extending from the mount ring to a support of a shaft of the engine and defining a load path for loads from a propeller; an annular turbine support case received within the outer case and connected to the outer case only through a direct connection with the annular flange, the support case extending free of the load path; a turbine section received within the outer case and including a rotor in driving engagement with the shaft and closely surrounded by a shroud with an annular tip clearance being defined therebetween, the shroud being directly connected to and located by the turbine support case.

In a further aspect, there is provided a method of isolating a turbine shroud from propeller loads in a propeller engine having an outer case with a mount for attachment of the engine to an aircraft along a plane to transfer the propeller loads, the method comprising: supporting a shaft of the engine with a portion of the outer case extending from the mount and defining a load path for the propeller loads through the portion of the outer case; attaching a turbine support case to extend free of the load path including attaching the turbine support case to the outer case only through a connection along the plane allowing a limited relative pivoting motion between the turbine support case and the mount; and locating the turbine shroud by directly connecting the shroud to the turbine support case.

DESCRIPTION OF THE DRAWINGS

Reference is now made to the accompanying figures in which:

FIG. 4 is a schematic cross-sectional view of an attachment of the turbine support case to an outer case of the engine of FIG. 3, according to a particular embodiment.

DETAILED DESCRIPTION

Figure 1:
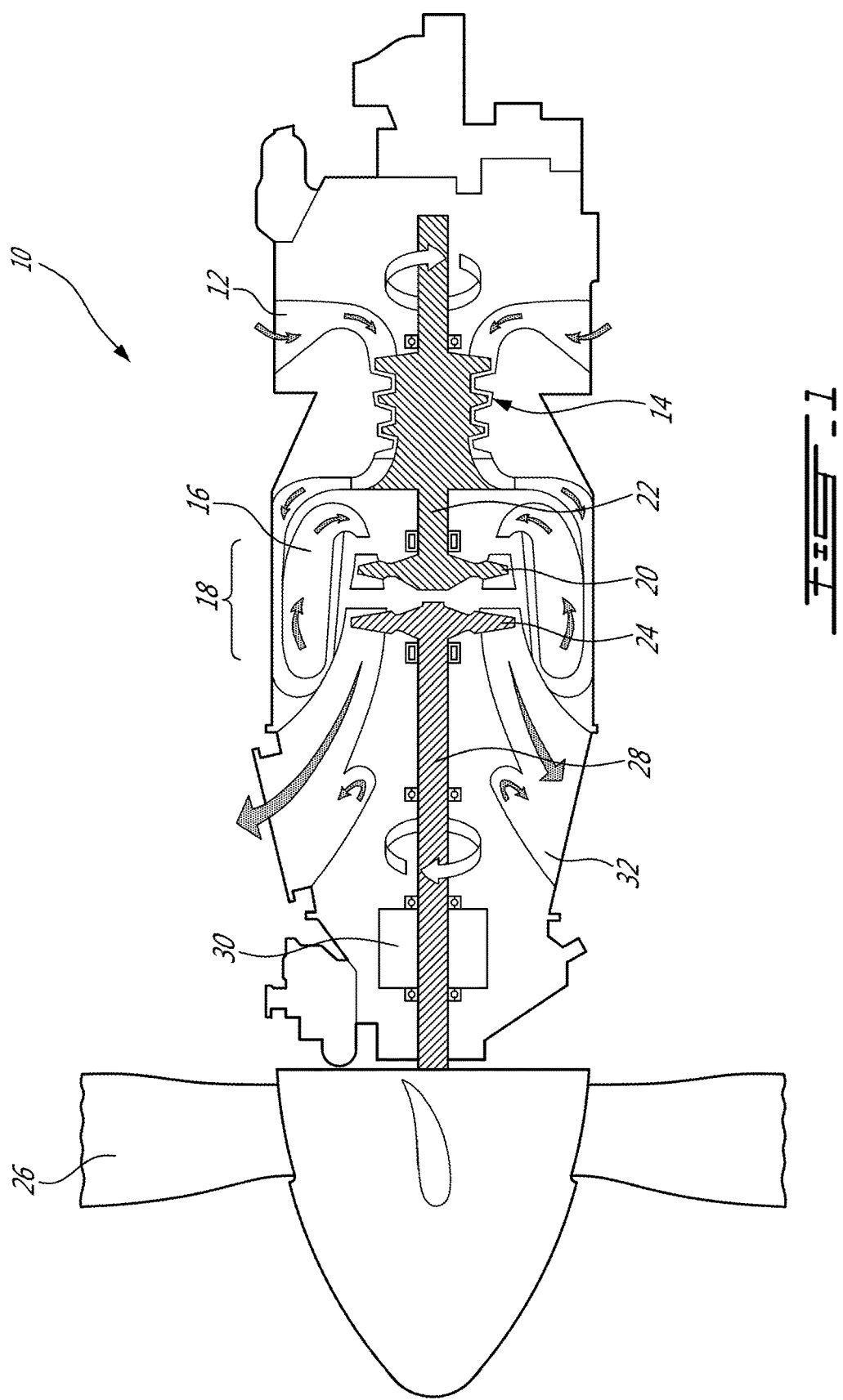
FIG. 1 is a schematic cross-sectional view of a gas turbine engine.

FIG. 1 illustrates a gas turbine engine 10 of a type preferably provided for use in subsonic flight, generally comprising in serial flow communication an air inlet 12 through which ambient air enters the engine, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 includes a compressor turbine section 20 driving the rotor(s) of the compressor section 14 through a compressor shaft 22, and a free power turbine section 24 driving a propeller 26 through a power shaft 28 and an appropriate type of gearbox 30.

In the present specification, including the claims, the terms "upstream" and "downstream" are defined with reference to the general direction of the airflow between the engine inlet 12 and engine outlet 32; as such, an element "upstream" of another is closer to the air inlet 12. The combustor 16 is illustrated herein as a reverse flow combustor, and as such the "upstream" and "downstream" directions around the combustor 16 may not correspond to the actual direction of the flow at that location.

Figure 2:
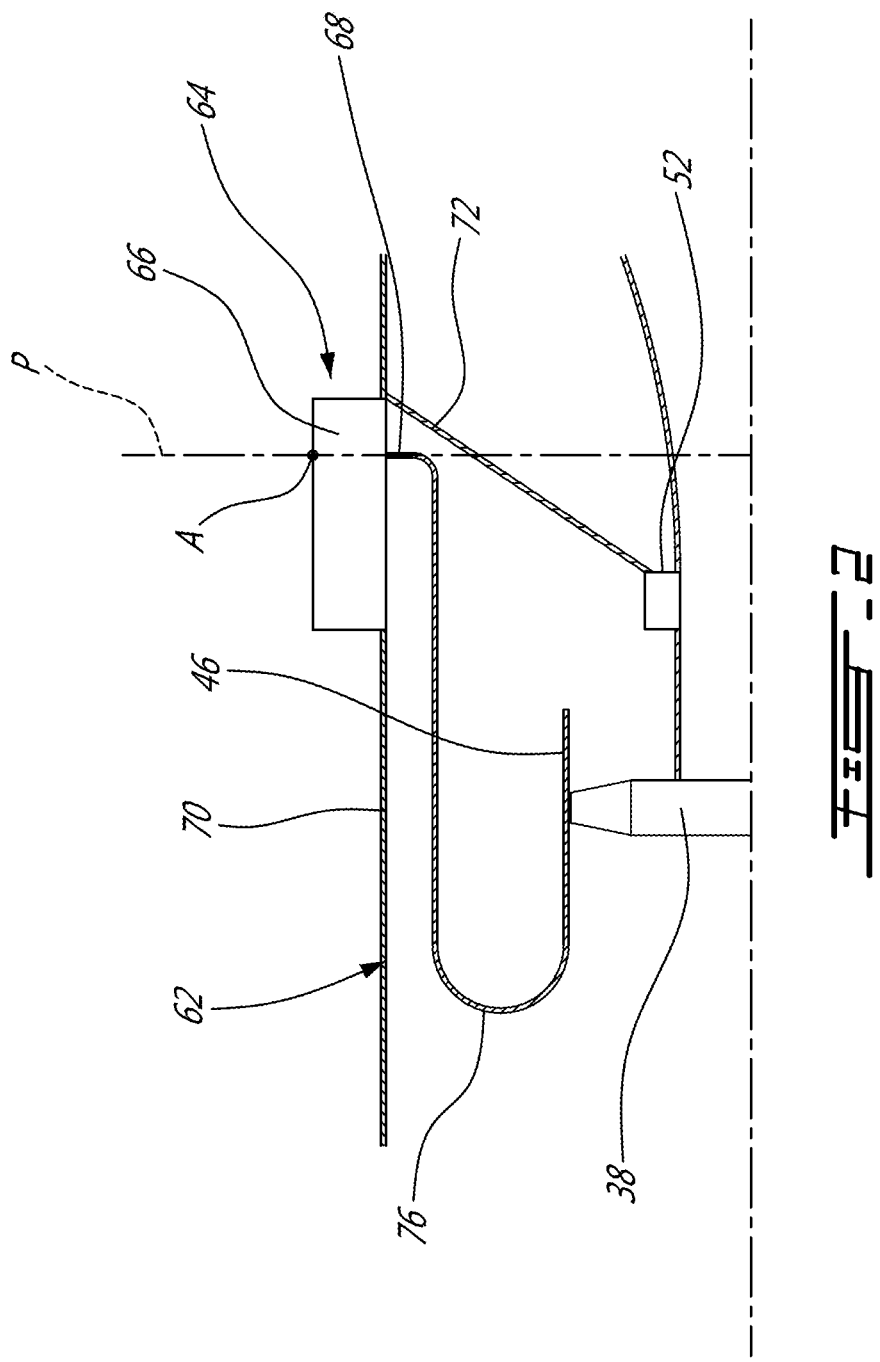
FIG. 2 is a schematic cross-sectional view of part of an engine such as shown in FIG. 1, with a turbine support case according to a particular embodiment.

Referring to FIG. 2, the compressor turbine section 20 includes a rotor 38 which is closely surrounded by a shroud 46. An annular tip clearance is defined between the tip of the blades of the rotor 38 and the inner surface of the shroud 46. The minimization of this tip clearance may allow for improved performances of the engine, and as such the position of the shroud 46 usually has tight tolerances.

The outer case 62 of the engine includes a mount ring 64, which in the embodiment shown is for attachment to an aircraft along a single mount plane P through any appropriate type of known attachment, for example at attachment location A (see also FIG. 3); as such the mount ring 64 is attached to the aircraft structure, and defines a single plane mount for the engine 10, i.e. the connection with the aircraft is made only along the single plane P. The mount ring 64 has an annular body 66 and an annular flange 68 extending radially inwardly therefrom, along the plane P. In the embodiment shown, the flange 68 and the mount ring body 66 are made of a single piece; alternately, the flange may 68 be manufactured separately from the mount ring body 66 and attached thereto.

The outer case 62 has a downstream portion 70 which may be integral (i.e. made of a single piece) with the mount ring body 66, or separately manufactured and connected thereto, for example by welding. The outer case 62 also has an upstream portion 72 which may be integral with the mount ring 64, or separately manufactured and connected thereto, for example through fasteners. The upstream portion 72 extends radially inwardly and supports the engine shaft, for example by being connected to a bearing housing 52. As such, a load path for the propeller loads is defined through the upstream portion 72.

The engine 10 includes an annular turbine support case 76 which is received in the outer case 62, and more particularly surrounded by the downstream portion 70 of the outer case 62. The support case 76 is connected to the outer case 62 only through a direct connection with the mount ring flange 68, in alignment with the plane P. The connection between the outer case 62 and the support case 76 allows for a limited relative pivoting motion between the support case 76 and the mount ring 64.

The support case 76 is free from the bearing housing 52 and only connected to the outer case 62 along the plane P, and is isolated from the load path and from the propeller loads created by moments reacted in that same plane, at the connection between the mount ring 64 and the aircraft. As such, in one embodiment, deflection of the support case 76 due to the propeller loads may be minimized or avoided.

The support case 76 supports the shroud 46 surrounding the rotor 38 of the compressor turbine section 20. The shroud 46 is directly connected to and located by the support case 76. For example, the shroud 46 may be formed in a single piece with the support case 76, or attached thereto in any other adequate manner, such as for example by welding. Attachment of the shroud 46 to the support case 76 isolated from the propeller loads may, in one embodiment, provide for a tighter tip clearance than the prior attachment of the shroud 46 to the adjacent vane ring.

Figure 3:
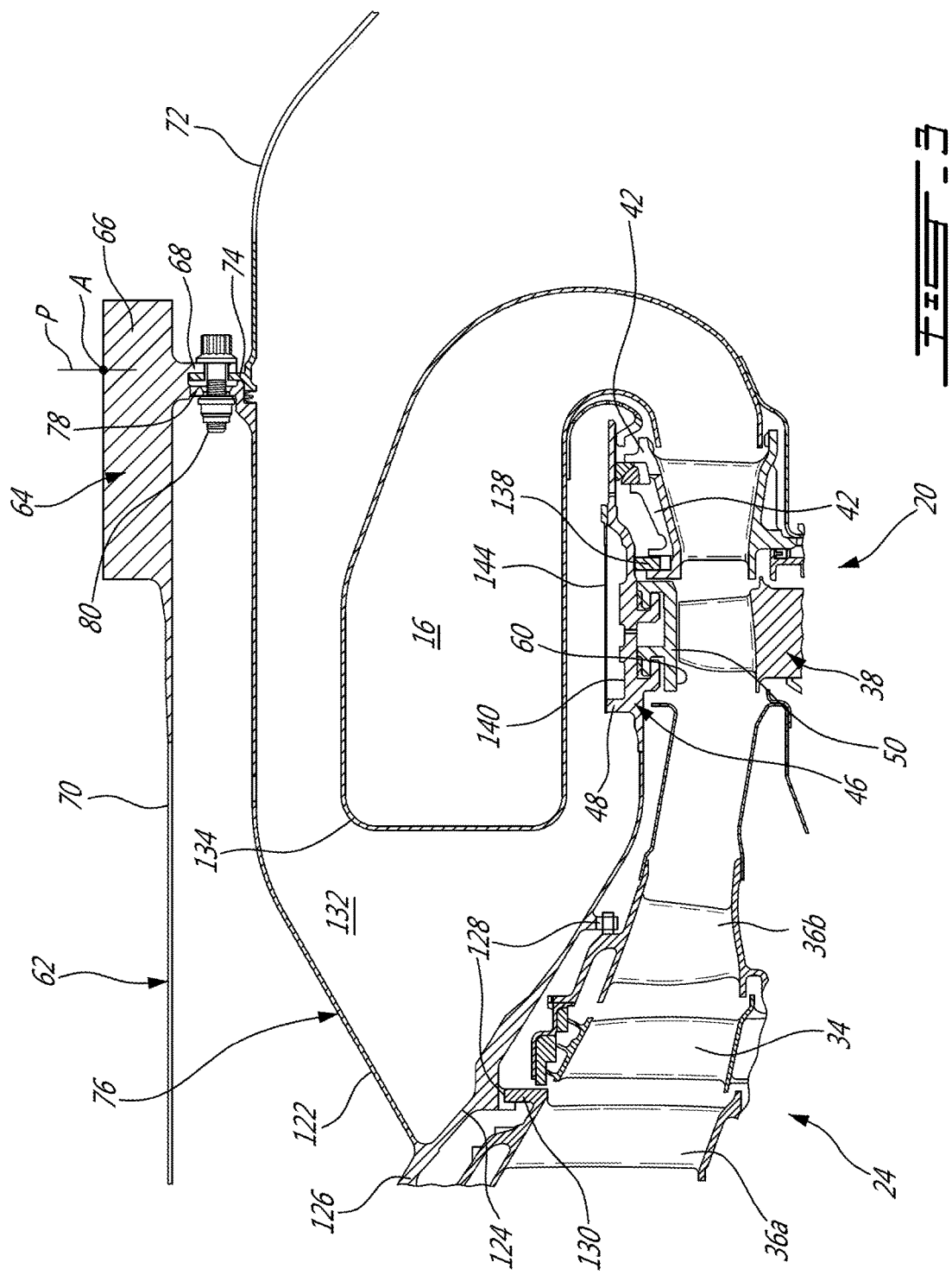
FIG. 3 is a schematic cross-sectional view of part of the engine shown in FIG. 2, with a turbine support case according to a particular embodiment.

Referring to FIG. 3, a particular embodiment is shown, where the downstream portion 70 of the outer case 62 is integral with the mount ring body 66, and the upstream portion 72 of the outer case 62 has a downstream end defined by a radially extending annular flange 74 connected to the mount ring flange 68 by an appropriate type of fasteners 80.

The plane P is defined upstream of the compressor turbine section 20, and the support case 76 includes concentric annular outer and inner sections 122, 124. The outer section 122 includes a support case flange 78 connected to the mount ring flange 68. The connection between the support case flange 78 and the mount ring flange 68 is provided by the same fasteners 80 connecting the upstream portion flange 74 to the mount ring flange 68. The remainder of the outer section 122 extends from the support case flange 78 at an angle, in a downstream and radially inward direction. The outer and inner sections 122, 124 meet at a downstream end 126 of the support case 76, which surrounds or extends beyond the downstream stator 36a of the power turbine section 24. The inner section 124 extends at an angle, in an upstream and radially inward direction from the downstream end 126, surrounding the flowpath of the engine 10.

In the embodiment shown, the power turbine section 24 includes two rotors 34 (only one of which is shown) each having a stator 36a,b immediately upstream thereof, such that a stator 36a is provided between the two rotors 34, and the inner section 124 supports the stators 36a,b around their outer perimeter. As such, the inner section 124 includes two annular stator flanges 128 extending radially inwardly therefrom, with each stator flange 128 being connected to a respective annular flange 130 defined in the outer perimeter of the respective stator 36a,b. The support case 76 also partially defines a cavity 132 in which the combustor 16 is received: in the embodiment shown, the dome end 134 of the combustor 16 is received between the outer and inner sections 122, 124.

The shroud 46 includes for example a shroud housing 48 and a plurality of shroud segments 50 attached thereto through mating and spring-loaded annular L-shaped flanges. The shroud housing 48 is directly connected to and located by the support case 76, and extends from the upstream end of the inner section 124. An annular seal 138 is provided between the shroud 46 and the adjacent stator ring 42. Other configurations for the shroud 46 are also possible.

The direct connection between the support case 76 and the shroud 46 may allow for the usual seal therebetween to be omitted. Accordingly, in one embodiment, having a seal located upstream of the rotor 38 and a continuous wall downstream of the rotor 38 may provide less performance loss than having a seal located downstream of the rotor 38 between separate shroud and support case.

The shroud housing 48 includes an annular depression 140 in its outer surface, covered by an annular impingement place 144 having a plurality of impingement cooling holes defined therethrough, to provide impingement cooling of the shroud 46. By avoiding the prior connection of the shroud housing 48 to the adjacent stator ring 42, typically made through axially extending fasteners, more room may be provided for the impingement cooling of the shroud 46, and as such in one embodiment the direct connection of the shroud 46 to the support case 76 facilitates impingement cooling of the shroud 46.

Referring to FIG. 4, an exemplary embodiment of the connection between the mount ring flange 68, the support case flange 78 and the flange 74 of the upstream portion 72 of the outer case 62 is shown and described herein. It is understood that any other type of connection allowing for a limited relative pivoting motion between the support case 76 and the mount ring 64 can alternately be used. As non-limiting examples, rivets, spherical joints, or a one-piece nut could alternately be used. Although a single fastener 80 is shown, it is understood that a circumferential array of such fasteners are provided.

In the embodiment shown, each fastener 80 includes a threaded bolt 82 and a threaded nut 84 engaged thereto, with the head 86 of the bolt 82 resting against the upstream surface 88 of the mount ring flange 68. The mount ring flange 68 has a cylindrical opening 90 defined therethrough, through which the bolt 82 extends. The upstream portion flange 74 rests against the downstream surface 92 of the mount ring flange 68, and has a cylindrical opening 94 defined therethrough through which the bolt 82 also extends. The upstream portion flange 74 extends from the upstream outer case portion 72 offset from its downstream end 96, such that the upstream outer case portion 72 includes an annular end wall 98 extending axially downstream of the flange 74.

The support case flange 78 has an opening 100 defined therethrough through which the bolt 82 loosely extends, i.e. an annular free space is defined around the bolt 82 within the opening 100. The opening 100 has a tapered shape, such that its diameter is greater at the upstream surface 102 of the support case flange 78. The nut 84 rests against the downstream surface 104 of the support case flange 78.

The support case flange 78 extends from the support case 76 offset from its upstream end 106, such that the support case 76 defines an annular end wall 108 extending axially upstream of the flange 78. The end wall 108 of the support case 76 surrounds the end wall 98 of the upstream outer case portion 72. The end wall 108 of the support case 76 abuts the upstream portion flange 74, creating an annular space 112 between the support case flange 78 and the upstream portion flange 74 in contact with the mount ring flange 68. The end wall 108 of the support case 76 is tapered such as to move progressively away from the end wall 98 of the upstream outer case portion 72, leaving an annular gap 110 therebetween adjacent the upstream portion flange 74.

The support case 76 includes an annular shoulder 114 extending radially inwardly from its end wall 108, downstream of its flange 78. The shoulder 114 is axially spaced apart from the end of the outer case end wall 98 and a spring member 116 is compressed between the radial surface 118 of the shoulder 114 and the radial surface 120 of the outer case end wall 98, biasing them away from each other.

The gap 110 between the end walls 98, 108, the free space 112 between the support case flange 78 and the upstream portion flange 74 contacting the mount ring flange 68, the free space around the bolt within the opening 100 of the support case flange 78 and the spring member 116 between the support case shoulder 114 and the outer case end wall 98 allow the abutment between the support case end wall 108 and the upstream portion flange 74 to act as a pivot point around which a limited amount of relative movement between the support case 76 and the mount ring 64 is possible.

The above description is meant to be exemplary only, and one skilled in the art will recognize that changes may be made to the embodiments described without departing from the scope of the invention disclosed. For example, although the mount ring 64 is depicted as a single plane mount, in another embodiment the mount ring 64 may be a front mount with one or more other mount(s) being provided along different plane(s). Other modifications which fall within the scope of the present invention will be apparent to those skilled in the art, in light of a review of this disclosure, and such modifications are intended to fall within the appended claims.

The invention claimed is:

1. A method of isolating a turbine shroud from propeller loads in an engine having an outer case with a mount defining a mount plane and an attachment location within the mount plane, the mount configured for attachment of the engine to an aircraft at the attachment location to transfer the propeller loads, the method comprising:
   supporting a shaft of the engine using a portion of the outer case extending from the mount and defining a load path for the propeller loads through the portion of the outer case;
   attaching a turbine support case to extend free of the load path by attaching the turbine support case to the outer case only through a connection along the mount plane, the connection defining a pivot point allowing a limited relative pivoting motion around the pivot point between the turbine support case and the mount; and
   locating the turbine shroud by directly connecting the turbine shroud to the turbine support case.

2. The method as defined in claim 1, wherein attaching the turbine support case to the outer case only through the connection along the mount plane includes attaching an upstream end of an annular outer section of the turbine support case to a flange extending radially inwardly from the mount within the mount plane.

3. The method as defined in claim 2, wherein attaching the turbine support case to the outer case only through the connection along the mount plane includes attaching a radially outwardly extending flange of the turbine support case to the flange of the mount with an annular space being defined between the flange of the turbine support case and the flange of the mount while abutting an end wall of the turbine support case extending beyond the flange of the turbine support case with a portion of the outer case, and biasing the turbine support case and the portion of the outer case away from each other radially inwardly of the flange of the turbine support case and radially inwardly of the abutted end wall.

4. The method as defined in claim 3, wherein attaching the turbine support case further includes attaching the flange of the turbine support case to a flange of the portion of the outer case, the flange of the portion of the outer case extending between the flange of the mount and the flange of the turbine support case, and abutting the end wall of the turbine support case with the portion of the outer case includes abutting the end wall of the turbine support case with the flange of the portion of the outer case.

5. The method as defined in claim 1, wherein the mount is a single plane mount.

6. The method as defined in claim 1, further comprising supporting at least one turbine stator along an outer perimeter thereof with the turbine support case.

7. The method as defined in claim 1, wherein attaching the turbine support case to the outer case only through the connection along the mount plane includes interconnecting flanges of the turbine support case and of the outer case through a circumferential array of fasteners and compressing a spring member between the turbine support case and the outer case radially inwardly of the circumferential array of fasteners.

* * * * *